United States Patent
Numata et al.

(10) Patent No.: US 9,297,450 B2
(45) Date of Patent: Mar. 29, 2016

(54) BICYCLE REAR SPROCKET

(71) Applicant: Shimano Inc., Sakai, Osaka (JP)

(72) Inventors: Shingo Numata, Osaka (JP); Tsuyoshi Fukumori, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/243,213

(22) Filed: Apr. 2, 2014

(65) Prior Publication Data

US 2015/0285358 A1 Oct. 8, 2015

(51) Int. Cl.
| F16H 55/30 | (2006.01) |
| F16H 55/12 | (2006.01) |
| F16H 55/08 | (2006.01) |
| B62M 9/10  | (2006.01) |

(52) U.S. Cl.
CPC .............. F16H 55/0873 (2013.01); B62M 9/10 (2013.01)

(58) Field of Classification Search
CPC ........... B62M 9/10; B62M 9/00; F16H 55/30; B60B 27/04; B60B 27/026
USPC .................................................. 474/160, 164
See application file for complete search history.

(56) References Cited

U.S. PATENT DOCUMENTS

| 4,889,521 | A | * | 12/1989 | Nagano | 474/164 |
| 5,192,248 | A | * | 3/1993 | Nagano | 474/140 |
| 5,192,249 | A | * | 3/1993 | Nagano | 474/160 |
| 5,409,422 | A | * | 4/1995 | Feng et al. | 474/156 |
| 5,514,042 | A | * | 5/1996 | Liou | 474/160 |
| 5,545,096 | A | * | 8/1996 | Su | 474/160 |
| 5,716,297 | A | * | 2/1998 | Bodmer | 474/78 |
| 5,738,603 | A | * | 4/1998 | Schmidt et al. | 474/158 |
| 5,782,712 | A | * | 7/1998 | Campagnolo | 474/152 |
| 5,876,296 | A | * | 3/1999 | Hsu et al. | 474/160 |
| 6,045,472 | A | * | 4/2000 | Sung et al. | 474/160 |
| 6,139,456 | A | * | 10/2000 | Lii et al. | 474/152 |
| 6,340,338 | B1 | * | 1/2002 | Kamada | 474/160 |
| 8,517,874 | B2 | * | 8/2013 | Reiter | 474/160 |
| 8,882,619 | B2 | * | 11/2014 | Braedt | 474/156 |
| 2001/0039224 | A1 | * | 11/2001 | Lim et al. | 474/160 |
| 2002/0086753 | A1 | * | 7/2002 | Yahata | 474/160 |
| 2004/0043855 | A1 | * | 3/2004 | Wei | 474/160 |
| 2004/0142782 | A1 | * | 7/2004 | Kamada et al. | 474/160 |
| 2011/0092327 | A1 | * | 4/2011 | Oishi | 474/160 |

* cited by examiner

*Primary Examiner* — Henry Liu
(74) *Attorney, Agent, or Firm* — Global IP Counselors

(57) ABSTRACT

A bicycle rear sprocket is basically provided with a sprocket body and a chain engagement structure. The sprocket body has a center rotational axis, a first side surface and a second side surface. The first and second side surfaces face oppositely with respect to an axial direction of the bicycle rear sprocket. The first side surface is a smaller sprocket facing side of the sprocket body. The chain engagement structure includes a plurality of sprocket teeth extending radially outward from an outer periphery of the sprocket body. The sprocket teeth include a first shift tooth and a second shift tooth. The second shift tooth is positioned at a third tooth position in a downstream direction of a rotational driving direction of the bicycle rear sprocket with respect to the first shift tooth. The first shift tooth and the second shift tooth function as a shift tooth when a bicycle chain moves from a smaller bicycle rear sprocket to the bicycle rear sprocket.

9 Claims, 8 Drawing Sheets

BICYCLE REAR SPROCKET

BACKGROUND

1. Field of the Invention

This invention generally relates to a bicycle rear sprocket. More specifically, the present invention relates to a bicycle rear sprocket that has a teeth arrangement configured to provide smooth and reliable downshifting from a smaller sprocket of a bicycle rear sprocket assembly to the bicycle rear sprocket.

2. Background Information

Typically, a multi-speed bicycle drive train includes a bicycle front sprocket assembly having one or more front sprockets, a bicycle rear sprocket assembly having a plurality of rear sprockets coupled to the rear wheel via a freewheel and a drive chain to propel the bicycle. Front and rear derailleurs are arranged to force or shift the chain laterally between the various front and rear sprockets, respectively.

In terms of a bicycle rear sprocket assembly, the term "downshift" as used herein refers to a shift from a smaller rear sprocket to a larger rear sprocket, while the term "upshift" as used herein refers to a shift from a larger rear sprocket to a smaller rear sprocket. Basically, when the bicycle rear sprocket assembly is rotated in a driving direction, the inner and outer link plates engage the teeth of one of the rear sprockets. In the case of a rear sprocket with an even number of teeth, the inner and outer link plates will always engage the same teeth. In the case of a rear sprocket with an odd number of teeth, the inner and outer link plates will alternately engage different teeth with each rotation of the bicycle rear sprocket assembly. Therefore, the teeth of the rear sprockets will alternately engage both the inner and outer link plates.

SUMMARY

Generally, the present disclosure is directed to a bicycle rear sprocket that is configured to provide smooth and reliable downshifting from a smatter sprocket of a bicycle rear sprocket assembly to the bicycle rear sprocket.

One aspect is to provide a bicycle rear sprocket that effectively provides stable shifting performance during downshifting with better productivity.

In view of the state of the known technology and in accordance with a first aspect of the present disclosure, a bicycle rear sprocket is provided that basically comprises a sprocket body and a chain engagement structure. The sprocket body has a center rotational axis, a first side surface and a second side surface. The first and second side surfaces face oppositely with respect to an axial direction of the bicycle rear sprocket. The first side surface is a smaller sprocket facing side of the sprocket body. The chain engagement structure includes a plurality of sprocket teeth extending radially outward from an outer periphery of the sprocket body. The sprocket teeth include a first shift tooth and a second shift tooth. The second shift tooth is positioned at a third tooth position in a downstream direction of a rotational driving direction of the bicycle rear sprocket with respect to the first shift tooth. The first shift tooth and the second shift tooth function as a shift tooth when a bicycle chain moves from a smaller bicycle rear sprocket to the bicycle rear sprocket.

In accordance with a second aspect of the present invention, the bicycle rear sprocket according to the first aspect is configured so that the sprocket teeth include either a first non-shift tooth with a first recess on the first side surface of the sprocket body, or a first toothless gap that is positioned in the downstream direction with respect to the first shift tooth.

In accordance with a third aspect of the present invention, the bicycle rear sprocket according to the second aspect is configured so that the sprocket teeth include either a second non-shift tooth with a second recess on the first side surface of the sprocket body, or a second toothless gap that is positioned in the downstream direction with respect to the second shift tooth.

In accordance with a fourth aspect of the present invention, the bicycle rear sprocket according to the first aspect is configured so that the first shift tooth has a first tip having a first leading corner on the first side surface of the sprocket body and a first trailing corner on the first side surface of the sprocket body. The first leading corner is positioned in the downstream direction with respect to the first trailing corner. The first leading corner is positioned closer to the first side surface of the sprocket body than the first trailing corner in the axial direction with respect to the center rotational axis.

In accordance with a fifth aspect of the present invention, the bicycle rear sprocket according to the fourth aspect is configured so that the second shift tooth has a second tip having a second leading corner on the first side surface of the sprocket body and a second trailing corner on the second side surface of the sprocket body. The second leading corner is positioned in the downstream direction with respect to the second trailing corner. The second leading corner is positioned closer to the first side surface of the sprocket body than the second trailing corner in the axial direction.

In accordance with a sixth aspect of the present invention, the bicycle rear sprocket according to the first aspect is configured so that a total number of the sprocket teeth is equal to or more than fifteen.

In accordance with a seventh aspect of the present invention, a bicycle rear sprocket assembly is provided that comprises a first sprocket and a second sprocket. The first sprocket includes a first sprocket body and a first chain engagement structure. The first sprocket body has a center rotational axis. The first chain engagement structure includes a plurality of first sprocket teeth that extends radially outward from an outer periphery of the first sprocket body. The first sprocket teeth include a first shift tooth and a second shift tooth. The second shift tooth is positioned at a third tooth position in a downstream direction of a rotational driving direction of the bicycle rear sprocket with respect to the first shift tooth. The second sprocket body has the center rotational axis. The second chain engagement structure includes a plurality of second sprocket teeth that extends radially outward from an outer periphery of the second sprocket body. The second sprocket is positioned adjacent to the first sprocket in an axial direction with respect to the center rotational axis. The total number of the first sprocket teeth is larger than a total number of the second sprocket teeth by one. Each of the first shift tooth and the second shift tooth selectively functions as a shift tooth when a bicycle chain moves from the second rear sprocket to the first rear sprocket.

In accordance with an eighth aspect of the present invention, the bicycle rear sprocket according to the seventh aspect is configured so that the first sprocket body has a first side surface and a second side surface. The first and second side surfaces face oppositely with respect to an axial direction of the bicycle rear sprocket assembly. The first side surface faces the second sprocket.

In accordance with a ninth aspect of the present invention, the bicycle rear sprocket according to the eighth aspect is configured so that the first sprocket teeth includes either a first non-shift tooth with a first recess on the first side surface of the first sprocket body, or a first toothless gap that is positioned in the downstream direction with respect to the first shift tooth.

In accordance with a tenth aspect of the present invention, the bicycle rear sprocket according to the ninth aspect is configured so that the first sprocket teeth includes either a second non-shift tooth with a second recess on the first side surface of the first sprocket body, or a second toothless gap that is positioned in the downstream direction with respect to the second shift tooth.

In accordance with an eleventh aspect of the present invention, the bicycle rear sprocket according to the seventh aspect is configured so that the first shift tooth has a first tip having a first leading corner on the first side surface of the first sprocket body and a first trailing corner on the first side surface of the first sprocket body. The first leading corner is positioned in the downstream direction with respect to the first trailing corner. The first leading corner is positioned closer to the first side surface of the first sprocket body than the first trailing corner in the axial direction with respect to the center rotational axis.

In accordance with a twelfth aspect of the present invention, the bicycle rear sprocket according to the eleventh aspect is configured so that the second shift tooth has a second tip having a second leading corner on the first side surface of the first sprocket body and a second trailing corner on the second side surface of the first sprocket body. The second leading corner is positioned in the downstream direction with respect to the second trailing corner. The second leading corner is positioned closer to the first side surface of the first sprocket body than the second trailing corner in the axial direction.

In accordance with a thirteenth aspect of the present invention, the bicycle rear sprocket according to the seventh aspect is configured so that a total number of the first sprocket teeth is equal to or more than fifteen.

Also other objects, features, aspects and advantages of the disclosed bicycle rear sprocket will become apparent to those skilled in the art from the following detailed description, which, taken in conjunction with the annexed drawings, discloses illustrative embodiments of the bicycle rear sprocket.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
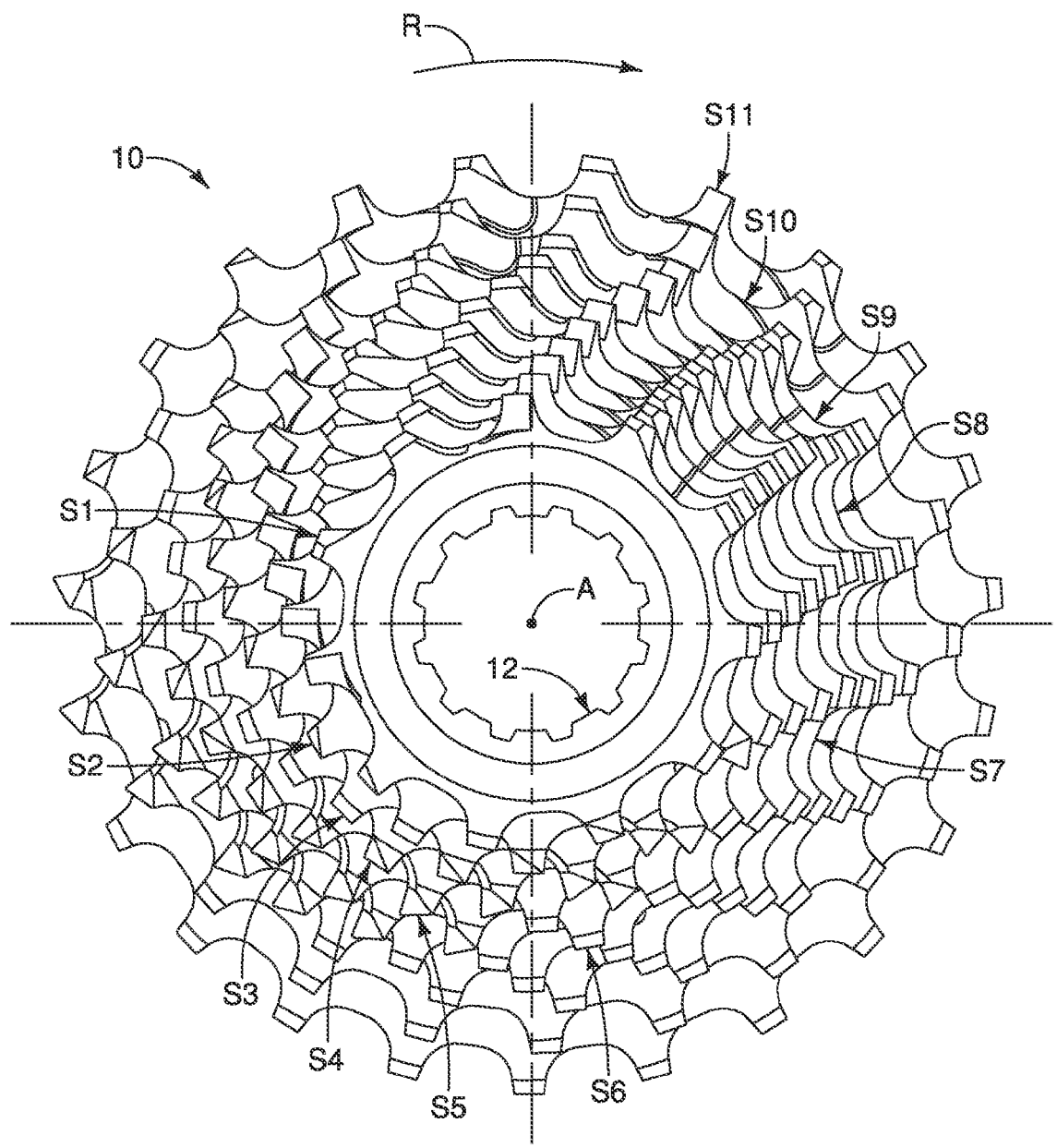
FIG. 1 is a side elevational view of a bicycle rear sprocket assembly in accordance with a first illustrative embodiment.
Figure 2:
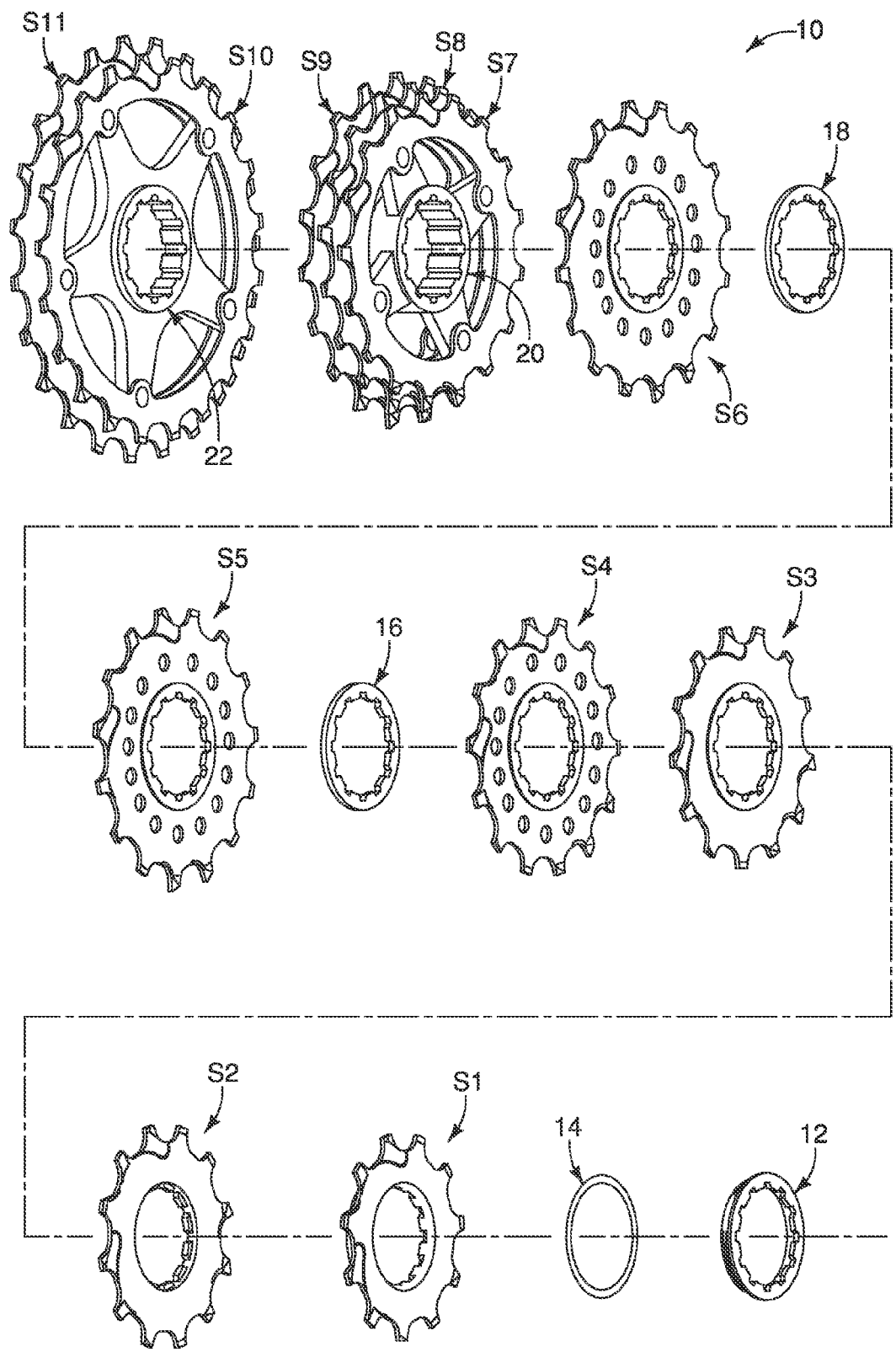
FIG. 2 is an exploded perspective view of the bicycle rear sprocket assembly illustrated in FIG. 1.

Referring initially to FIGS. 1 and 2, a multi-stage bicycle rear sprocket assembly 10 is illustrated in accordance with a first embodiment. Specifically, in the first embodiment, the rear sprocket assembly 10 includes a plurality bicycle rear sprockets S1 to S11, a lock ring 12, a lock ring spacer 14, a first sprocket spacer 16, a second sprocket spacer 18, a first sprocket carrier 20 and a second sprocket carrier 22. With this arrangement, the rear sprockets S1 to S11 are axially spaced from each other at predetermined intervals.

The first sprocket carrier 20 has the rear sprockets S7 to S9 fixed (e.g., riveted) to its outer periphery. The second sprocket carrier 22 has the rear sprockets S10 and S11 fixed (e.g., riveted) to its outer periphery. The first and second sprocket carriers 20 and 22 has a mounting structure for non-rotatably engaging a freewheel (not shown) of a rear hub (not shown) in a relatively conventional manner. The rear sprockets S1 to S6 have an internal opening that forms a mounting structure for non-rotatably engaging a freewheel (not shown) of a rear hub (not shown) in a relatively conventional manner. Thus, the rear sprockets S1 to S11 are configured to be fixedly mounted on a freewheel (not shown) of a rear hub (not shown) in a relatively conventional manner such that the rear sprockets S1 to S11 rotate together about a center rotational axis A. The rear sprockets S1 to S11 typically rotate together in a forward rotational driving direction R (e.g., in a clockwise direction as viewed in FIG. 1) when the rider is pedaling in a forward (clockwise) direction to propel the bicycle in a forward direction. The rear sprockets S1 to S11 have the following sprocket teeth combination: 11T-12T-13T-14T-15T-16T-17T-18T-191-21T-23T. However, the sprockets S1 to S11 are not limited to this sprocket teeth combination.

As explained below, the rear sprockets S2 to S11 have specially configured teeth that aid in performing an upshifting operation from a larger diameter sprocket to a smaller diameter sprocket. The rear sprocket S1 can have relatively conventional teeth as shown or can be modified to include specially configured teeth that aid in performing an upshifting operation as needed and/or desired. Of course, it will be apparent to those skilled in the bicycle art from this disclosure that the sprocket assembly 10 in can have fewer or more sprockets. In any case, the bicycle rear sprocket assembly 10 comprises at least a first sprocket and a second sprocket. In other words, the sprocket assembly 10 can be any multi-stage sprocket assembly for a bicycle that uses a derailleur or the like and which includes at least one large sprocket and at least one small sprocket.

As seen in FIGS. 1 and 2, the rear sprockets S1 to S11 are hard, rigid disc shaped members formed from a suitable material such as a metallic material. In the first embodiment, the rear sprockets S1 to S11 are each a one-piece, unitary member formed of a metallic material that is suitable for a bicycle sprocket. Preferably, the rear sprockets S1 to S11 are formed by a punching process and a barrel-polishing process. In the barrel-polishing process burrs from the punching process are removed from the teeth resulting in a rounded tooth tip.

In the first embodiment, each of the rear sprockets S2 to S11 includes the same basic teeth configuration for creating two downshift paths as explained below. For the sake of brevity, only the teeth configurations of the rear sprockets S7 and S8 will be described to explain the two upshift paths. However, the same teeth configurations of the rear sprockets S7 and S8 for creating two downshift paths is also included in the rear sprockets S2 to S7 and S9 to S11.

The bicycle rear sprocket S8 constitutes an example of a first rear sprocket. The bicycle rear sprocket S7 constitutes an example of a second rear sprocket, since the bicycle (second) rear sprocket S7 is the next smaller sprocket that is adjacent to the bicycle (first) rear sprocket S8. The bicycle rear sprocket S9 constitutes an example of a third rear sprocket, since the bicycle (third) rear sprocket S9 is the next larger sprocket that is adjacent to the bicycle (first) rear sprocket S8.

Figure 3:
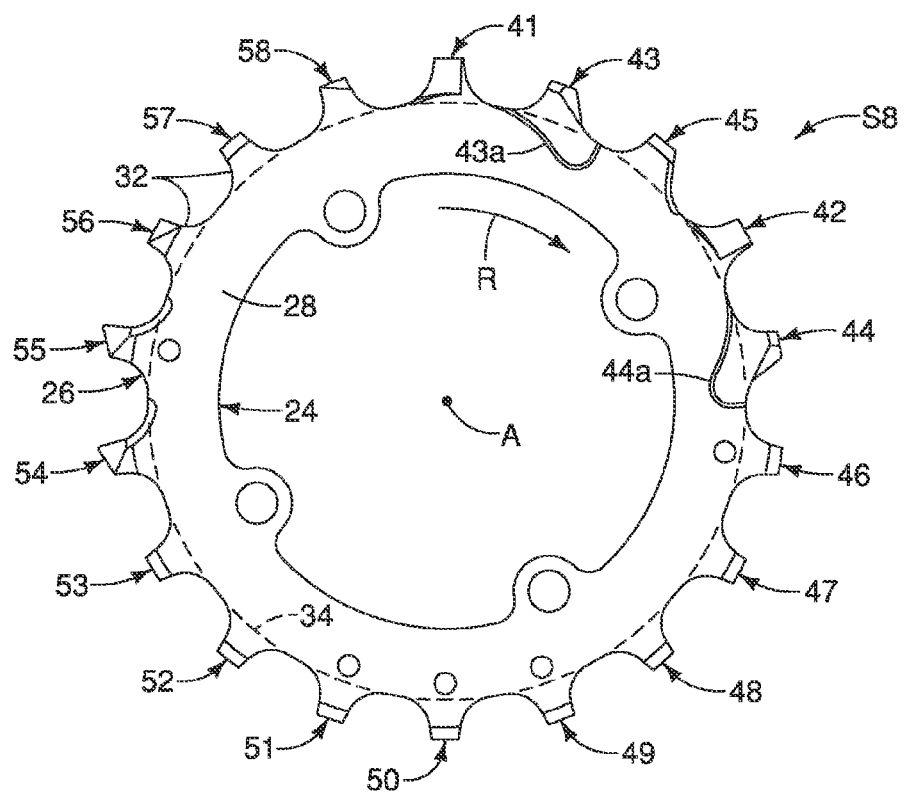
FIG. 3 is a small sprocket side elevational view of the bicycle rear sprocket having eighteen teeth of the bicycle rear sprocket assembly illustrated in FIGS. 1 and 2.
Figure 4:
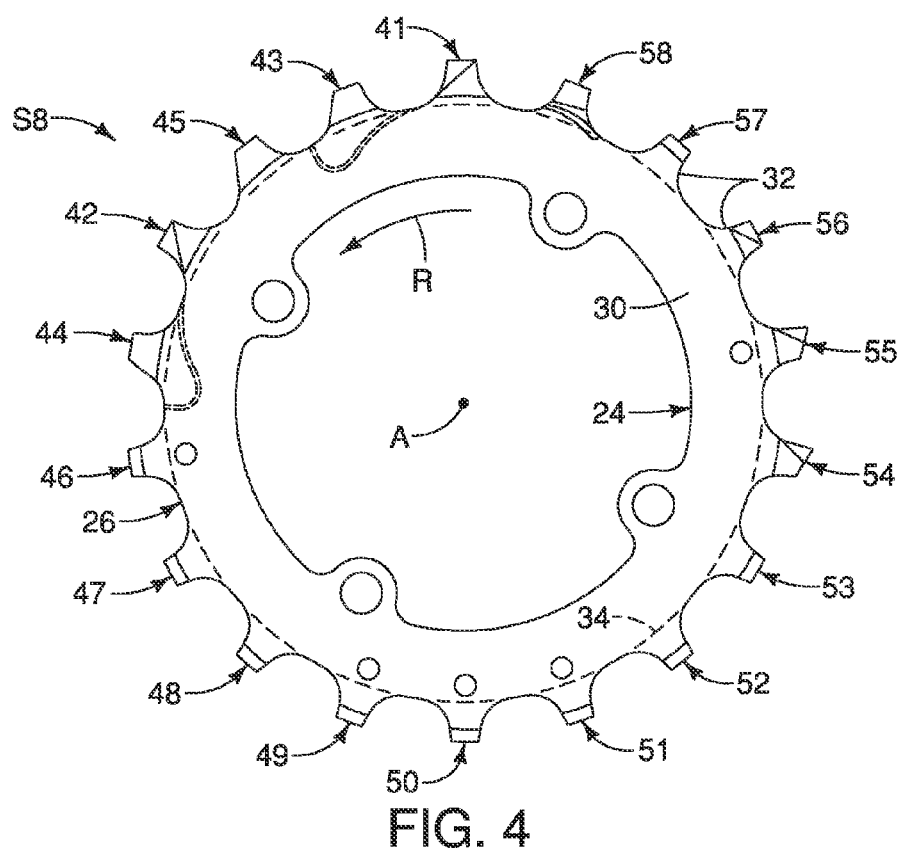
FIG. 4 is a large sprocket side elevational view of the bicycle rear sprocket illustrated in FIG. 3.

As seen in FIGS. 3 and 4, the first rear sprocket S8 includes a first sprocket body 24 and a first chain engagement structure 26. The first sprocket body 24 has the center rotational axis A, a first side surface 28 and a second side surface 30. The first and second side surfaces 28 and 30 face oppositely with respect to an axial direction of the bicycle rear sprocket assembly 10. The first side surface 28 is a smaller sprocket facing side of the first sprocket body 24. Thus, the first side surface 28 faces the second rear sprocket S7, and the second side surface 30 faces the third rear sprocket S9.

As seen in FIGS. 3 and 4, the first chain engagement structure 26 includes a plurality of first sprocket teeth 32 that extends radially outward from an outer periphery 34 of the first sprocket body 24. A trough or root is interposed between each adjacent ones of the first sprocket teeth 32. Preferably, the first sprocket teeth 32 are equally spaced apart from each other. Thus, the troughs are arranged in an alternating manner between the first sprocket teeth 32 and equally spaced apart from each other.

Figure 5:
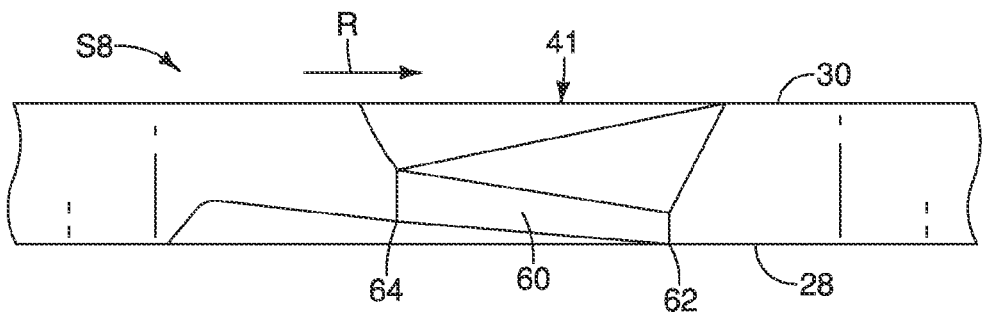
FIG. 5 is a partial edge elevational view of the first shift teeth of the bicycle rear sprocket illustrated in FIG. 3.
Figure 6:
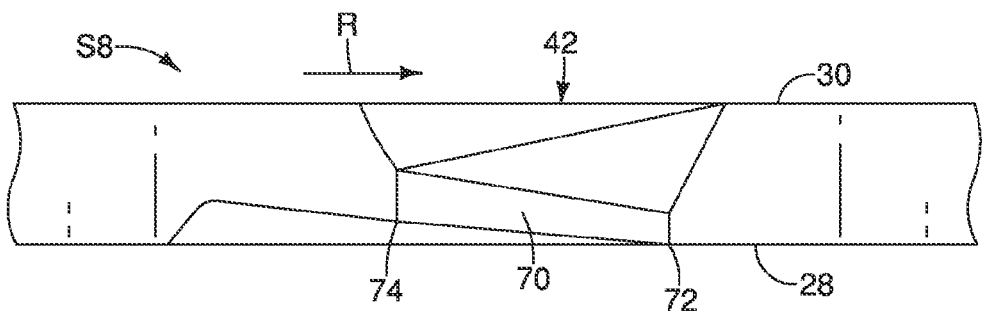
FIG. 6 is a partial edge elevational view of the second shift teeth of the bicycle rear sprocket illustrated in FIG. 3.

In the case of the bicycle (first) rear sprocket S8, the first sprocket teeth 32 include a first shift tooth 41 and a second shift tooth 42. The second shift tooth 42 is positioned at a third tooth position in a downstream direction of the rotational driving direction R of the bicycle rear sprocket assembly 10 with respect to the first shift tooth 41. Each of the first shift tooth 41 and the second shift tooth 42 selectively functions as a shift tooth when a bicycle chain C moves from the second rear sprocket S7 (a smaller bicycle rear sprocket) to the first rear sprocket S8. In the first embodiment, the first shift tooth 41 and the second shift tooth 42 are identical in configuration as seen in FIGS. 5 and 6.

In the first embodiment, in the case of the bicycle (first) rear sprocket S8, the first sprocket teeth 32 also include a first non-shift tooth 43 with a first recess 43a on the first side surface 28 of the first sprocket body 24. The first recess 43a extends along the tooth base to aid in downshifting by allowing the chain C to move closer to the center of the bicycle (first) rear sprocket S8 during a downshift from the bicycle (second) rear sprocket S7 to the bicycle (first) rear sprocket S8. Therefore, as will be apparent from this disclosure, the first sprocket teeth 32 can include either a first non-shift tooth with a first recess on the first side surface 28 of the first sprocket body 24, or a first toothless gap that is positioned in the downstream direction with respect to the first shift tooth 41.

Figure 7:
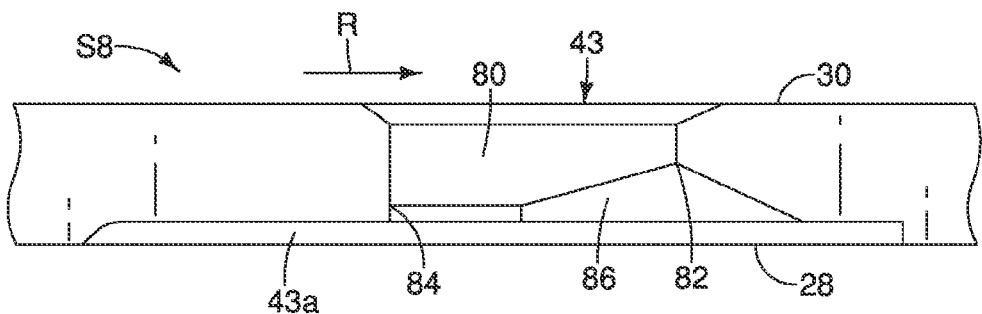
FIG. 7 is a partial edge elevational view of the first non-shift teeth of the bicycle rear sprocket illustrated in FIG. 3.
Figure 8:
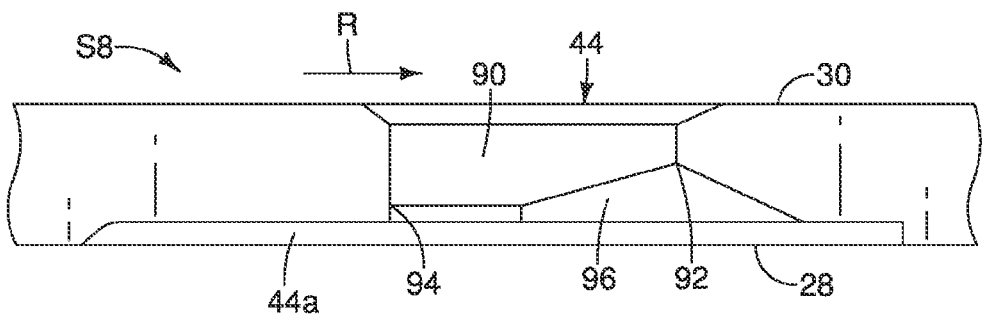
FIG. 8 is a partial edge elevational view of the second non-shift teeth of the bicycle rear sprocket illustrated in FIG. 3.

Further in the first embodiment, in the case of the bicycle (first) rear sprocket S8, the first sprocket teeth 32 also include a second non-shift tooth 44 with a second recess 44a on the first side surface 28 of the first sprocket body 24. The second recess 44a extends along the tooth base to aid in downshifting by allowing the chain C to move closer to the center of the bicycle (first) rear sprocket S8 during a downshift from the bicycle (second) rear sprocket S7 to the bicycle (first) rear sprocket S8. However, as will be apparent from this disclosure, the first sprocket teeth 32 can include either a second non-shift tooth with a second recess on the first side surface 28 of the first sprocket body 24, or a second toothless gap that is positioned in the downstream direction with respect to the second shift tooth 42. In the first embodiment, the first non-shift tooth 43 and the second non-shift tooth 44 are identical in configuration as seen in FIGS. 7 and 8.

In the case of the bicycle (first) rear sprocket S8, the first sprocket teeth 32 also include an auxiliary tooth 45 that is located between the first non-shift tooth 43 and the second shift tooth 42. As seen in FIGS. 3 and 4, the auxiliary tooth 45 is configured to aid in an upshifting operation such that the chain C is guided toward the bicycle (second) rear sprocket S7, which is the next smaller rear sprocket. The auxiliary tooth 45 is a conventional tooth, and thus, will not be discussed in detail herein.

In the case of the bicycle (first) rear sprocket S8, the first sprocket teeth 32 also include additional teeth 46 to 58. These teeth are not important to a downshifting operation, and thus, will not be discussed in detail herein. Preferably, some of the additional teeth 46 to 58 establish an upshifting path. In an upshifting operation from the larger sprocket to the smaller sprocket, the larger sprocket is considered the original sprocket, and the smaller sprocket is considered the receiving sprocket.

As seen in FIG. 5, the first shift tooth 41 has a first tip 60 having a first leading corner 62 on the first side surface 28 of the first sprocket body 24 and a first trailing corner 64 on the second side surface 30 of the first sprocket body 24. The first leading corner 62 is positioned in the downstream direction with respect to the first trailing corner 64. The first leading corner 62 is positioned closer to the first side surface 28 of the first sprocket body 24 than the first trailing corner 64 in the axial direction with respect to the center rotational axis A.

As seen in FIG. 6, the second shift tooth 42 has a second tip 70 having a second leading corner 72 on the first side surface 28 of the first sprocket body 24 and a second trailing corner 74 on the second side surface 30 of the first sprocket body 24. The second leading corner 72 is positioned in the downstream direction with respect to the second trailing corner 74. The second leading corner 72 is positioned closer to the first side surface 28 of the first sprocket body 24 than the second trailing corner 74 in the axial direction with respect to the center rotational axis A.

Referring to FIG. 7, an edge view of the first non-shift tooth 43 is illustrated. Here, the first non-shift tooth 43 has a first tip 80 having a first leading corner 82 on the first side surface 28 of the first sprocket body 24 and a first trailing corner 84 on the second side surface 30 of the first sprocket body 24. The first leading corner 82 is positioned in the downstream direction with respect to the first trailing corner 84. The first leading corner 82 is positioned closer to the second side surface 30 of the first sprocket body 24 than the first trailing corner 84 in the axial direction with respect to the center rotational axis A. In particular, the first non-shift tooth 43 has a first inclined surface 86 that is inclined toward the second side surface 30 of the first sprocket body 24 as the first inclined surface 86 extends radially outward toward the first tip 80.

Referring to FIG. 8, an edge view of the second non-shift tooth 44 is illustrated. Here, the second non-shift tooth 44 has a second tip 90 having a second leading corner 92 on the first side surface 28 of the first sprocket body 24 and a second trailing corner 94 on the second side surface 30 of the first sprocket body 24. The second leading corner 92 is positioned in the downstream direction with respect to the second trailing corner 94. The second leading corner 92 is positioned closer to the second side surface 30 of the first sprocket body 24 than the second trailing corner 94 in the axial direction with respect to the center rotational axis A. In particular, the second non-shift tooth 44 has a second inclined surface 96 that is inclined toward the second side surface 30 of the first sprocket body 24 as the second inclined surface 96 extends radially outward toward the second tip 90.

Figure 9:
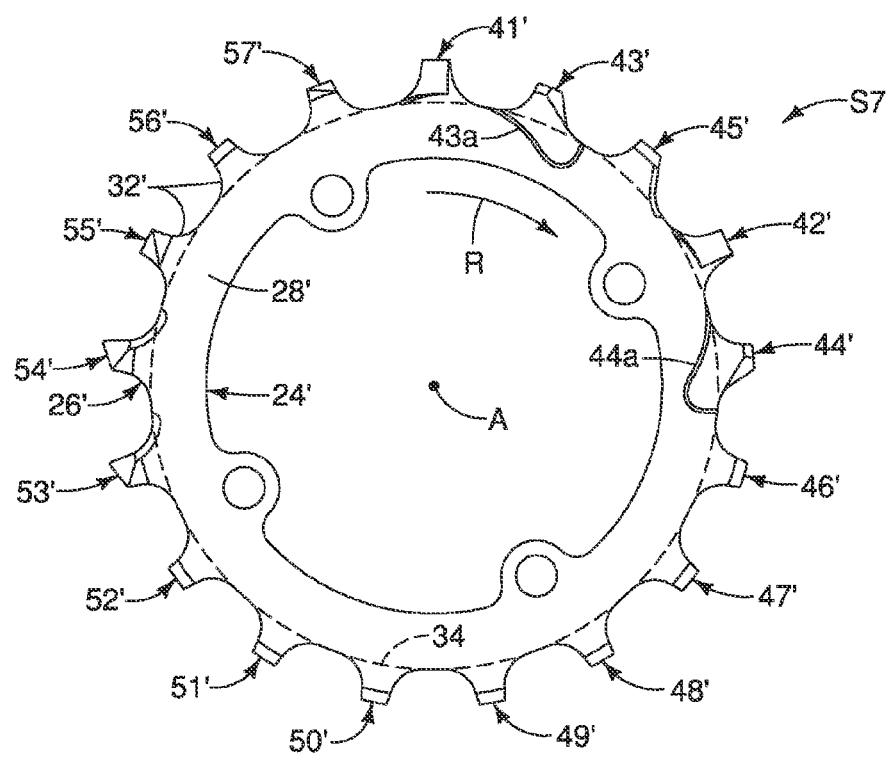
FIG. 9 is a small sprocket side elevational view of the bicycle rear sprocket having seventeen teeth of the bicycle rear sprocket assembly illustrated in FIGS. 1 and 2.
Figure 10:
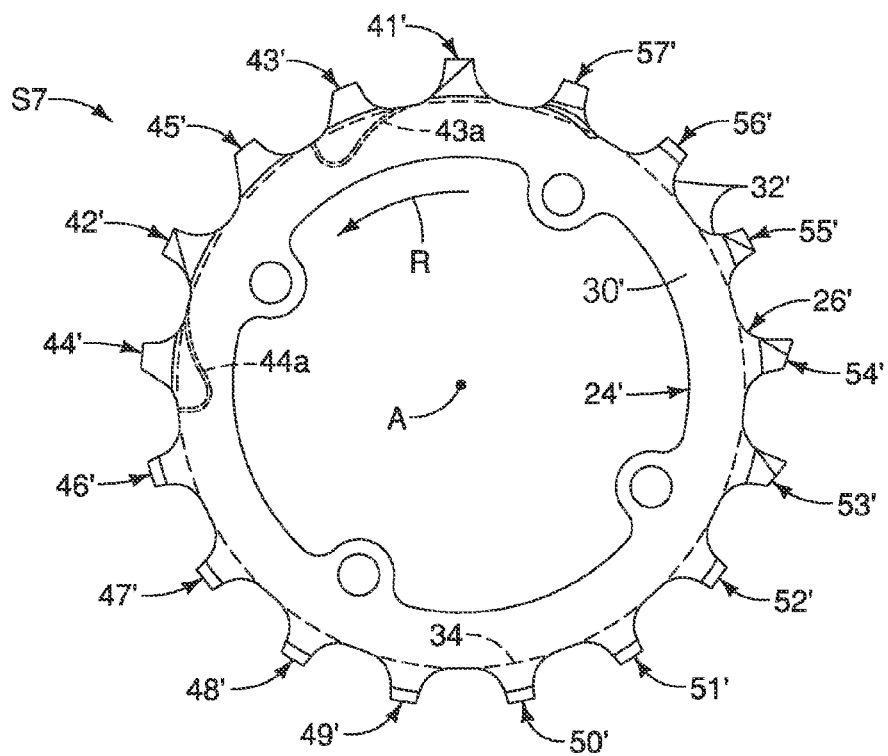
FIG. 10 is a large sprocket side elevational view of the bicycle rear sprocket illustrated in FIG. 9.

Referring now to FIGS. 9 and 10, the bicycle (second) rear sprocket S7 has a second sprocket body 24' and a second chain engagement structure 26'. The second sprocket body 24' has the center rotational axis A. The second sprocket body 24' has a first side surface 28' and a second side surface 30'. The second chain engagement structure 26' includes a plurality of second sprocket teeth 32' that extends radially outward from an outer periphery 34' of the second sprocket body 24'. The bicycle (second) rear sprocket S7 is positioned adjacent to the first sprocket S8 in an axial direction on the outboard side with respect to the center rotational axis A. The bicycle (second) rear sprocket S7 is basically identical to the bicycle (first) rear sprocket S8, except that the rear sprocket S7 is smaller in size and has one less tooth. Thus, the second sprocket teeth 32' includes a first shift tooth 41', a second shift tooth 42', a first non-shift tooth 43', a second non-shift tooth 44' and an auxiliary tooth 45'. The first non-shift tooth 43' has a first recess 43a on the first side surface 28' of the first sprocket body 24'. The second non-shift tooth 44' has a second recess 44a on the first side surface 28' of the second sprocket body 24'. In view of the similarities between the bicycle (second) rear sprocket S7 and bicycle (first) rear sprocket S8, the bicycle (second) rear sprocket S7 will not be discussed in detail herein.

Figure 11:
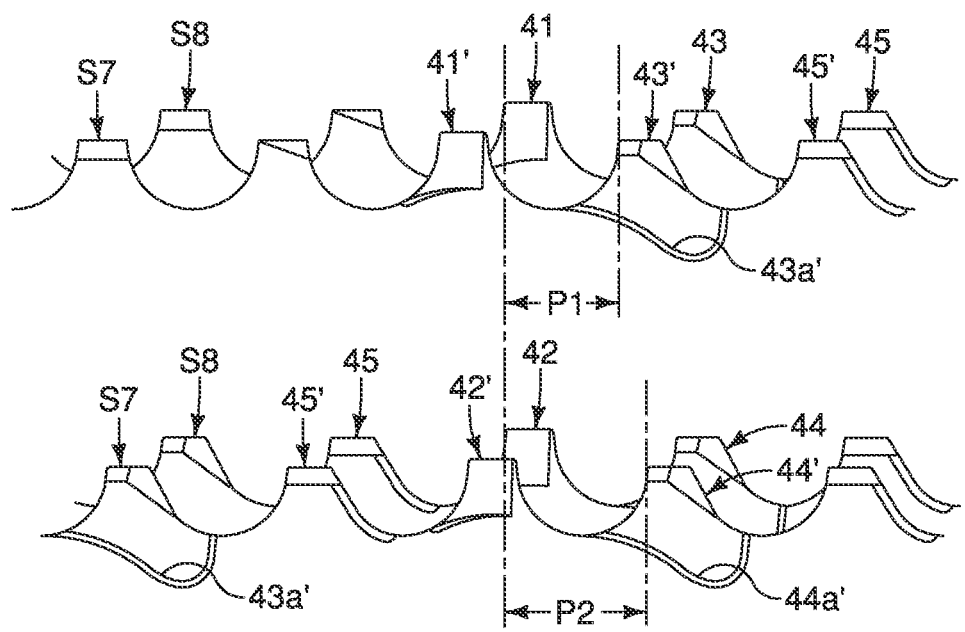
FIG. 11 is a schematic small sprocket side elevational view of two portions of two adjacent ones of the bicycle rear sprockets of the bicycle rear sprocket assembly illustrated in FIGS. 1 and 2.
Figure 12:
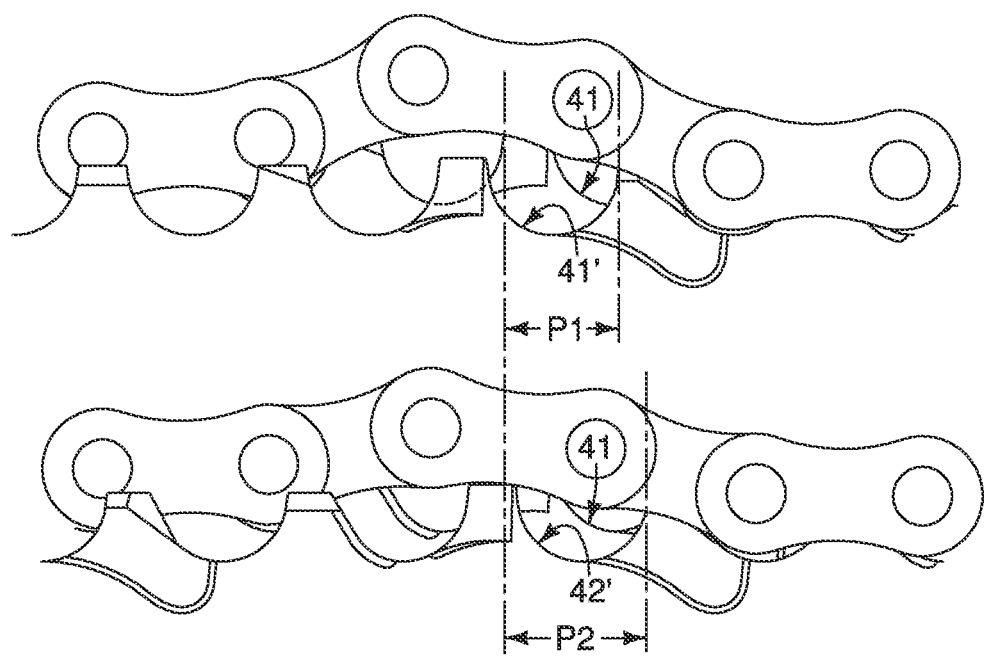
FIG. 12 is a schematic small sprocket side elevational view, similar to FIG. 11, of two portions of two adjacent ones of the bicycle rear sprockets of the bicycle rear sprocket assembly but further showing a bicycle chain being shifted from a smaller rear sprocket to a smaller rear sprocket for performing an downshift operation.

As seen in FIGS. 11 and 12, the teeth 41 to 45 of the first sprocket teeth 32 establish two downshifting paths. In the downshifting operation, the smaller sprocket (e.g., the rear sprocket S7) is considered the original sprocket, and the larger sprocket (e.g., the rear sprocket S8) is considered the receiving sprocket. In particular, the first shift tooth 41 and the second shift tooth 42 of the rear sprocket S8 are each a first engagement tooth, which is the first tooth to catch a link of the chain C when the chain C is shifted to perform a downshifting operation from the bicycle (second) rear sprocket S7 (the smaller diameter sprocket) to the bicycle (first) rear sprocket S8 (the larger diameter sprocket). As seen in FIGS. 11 and 12, with the illustrated tooth configuration, the pitch P1 between the second shift tooth 42 and the second non-shifting tooth 44' is shorter than the pitch P2 between the first shift tooth 41 and the first non-shifting tooth 43'. As shown schematically in the upper portion of FIG. 12, the chain C is picked up higher by the first shift tooth 41 and then engages the subsequent teeth of the bicycle (first) rear sprocket S8. On the other hand, the chain C is picked up minimally by the second shift tooth 42 and then engages the subsequent teeth of the bicycle (first) rear sprocket S8 as shown schematically in the lower portion of FIG. 12. In this way, with the illustrated tooth configuration, stable shifting performance can be attained with better productivity. Further, even if the first shift tooth 41 fails to catch the chain C due to antiphase of the chain C during a downshift from the bicycle rear sprocket S7 to the bicycle rear sprocket S8, the second shift tooth 42 auxiliary catches the chain C so that shifting feeling can be comfortable for a rider.

In the first embodiment, as mentioned above, each of the bicycle rear sprockets S2 to S11 includes the same basic teeth configuration for creating two downshift paths similar to the bicycle rear sprockets S7 and S8. Basically, the bicycle rear sprockets S2 to S11 only differ in their overall diameter, number of teeth, hub mounting structure and the size/number of weight reducing openings (if any). Of course, the sprockets S1 to S11 can be different from each other with respect to other features not related to the present invention. The downshifting configuration provided by the teeth 41 to 44 functions better when a total number of the first sprocket teeth is equal to or more than fifteen such as in the case of the bicycle rear sprockets S5 to S11. Moreover, the downshifting configuration provided by the teeth 41 to 44 functions better when the total number of the first (larger) sprocket teeth is larger than a total number of the second (smaller) sprocket teeth by one such as in the case of the bicycle rear sprockets S2 to S9. In addition, the downshifting configuration provided by the teeth 41 to 44 functions best when a total teeth number of the rear sprocket is equal to or more than fifteen and the adjacent rear sprockets have a total teeth number that is different by one sprocket tooth with respect to the smaller rear sprocket such as in the case of the bicycle rear sprockets S5 to S9.

Figure 13:
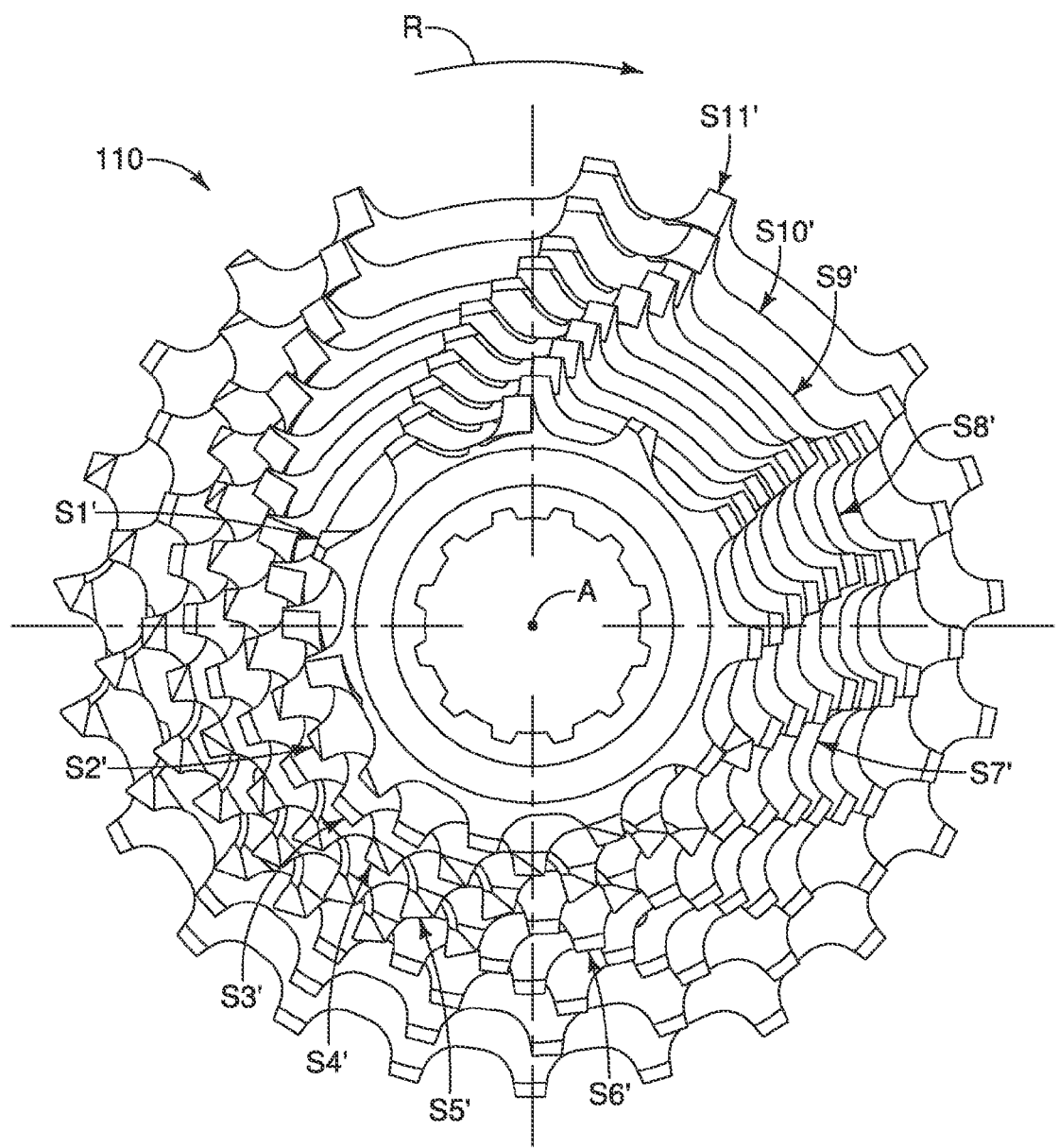
FIG. 13 is a side elevational view of a bicycle rear sprocket assembly in accordance with a second illustrative embodiment.
Figure 14:
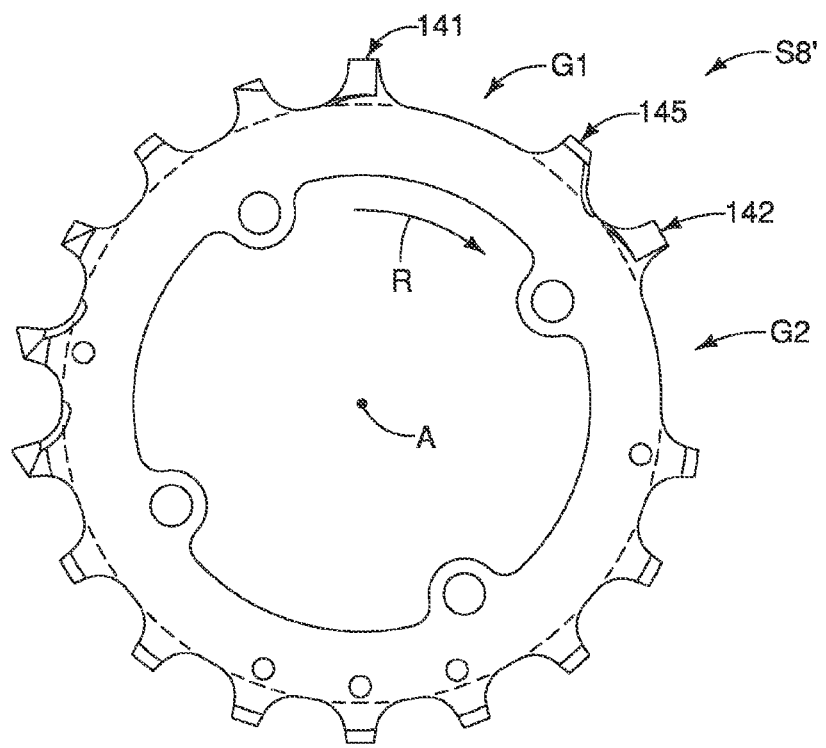
FIG. 14 is a small sprocket side elevational view of the bicycle rear sprocket having eighteen teeth positions of the bicycle rear sprocket assembly illustrated in FIG. 13.
Figure 15:
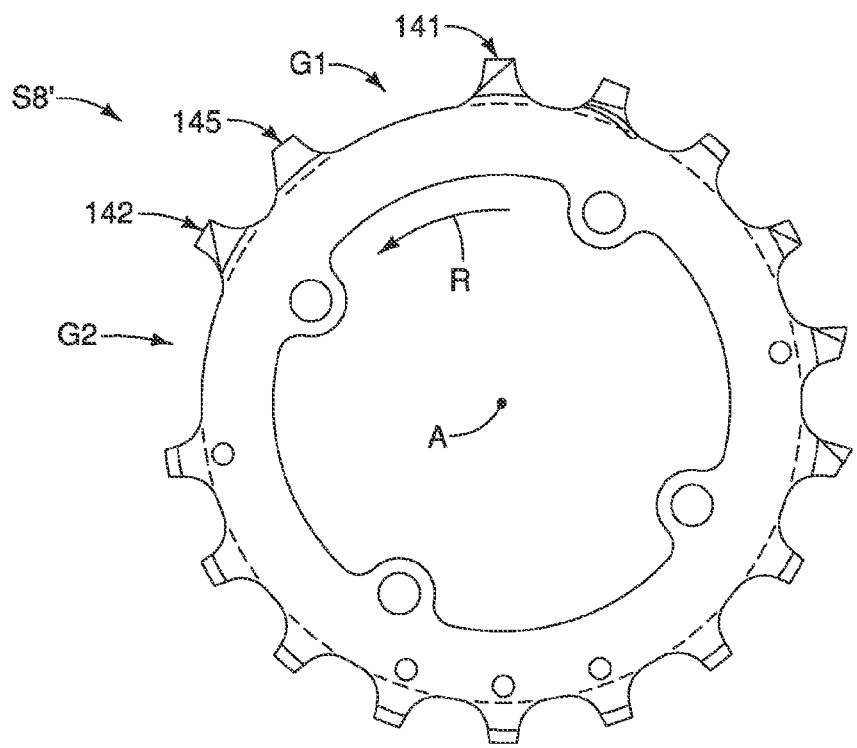
FIG. 15 is a large sprocket side elevational view of the bicycle rear sprocket illustrated in FIG. 14.

Referring to now FIGS. 13 to 15, a multi-stage bicycle rear sprocket assembly 110 is illustrated in accordance with a second embodiment. Specifically, in the second embodiment, the rear sprocket assembly 110 includes a plurality bicycle rear sprockets S1' to S11'. Here, the rear sprocket assembly 110 is identical to the rear sprocket assembly 10, except that the rear sprockets S2' to S11' have been modified so that the first non-shift tooth 43 and the second non-shift tooth 44 have been cutout to form toothless gaps G1 and G2. Thus, for example, as seen in FIGS. 14 and 15, the rear sprocket S8' includes a first shift tooth 141, a second shift tooth 142 and an auxiliary tooth 145. In view of the similarities between the rear sprocket assembly 10 and the rear sprocket assembly 110, the rear sprocket assembly 110 will not be discussed in detail herein.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle rear sprocket assembly. Accordingly, these terms, as utilized to describe the bicycle rear sprocket should be interpreted relative to a bicycle equipped with the bicycle rear sprocket as used in the normal riding position on a horizontal surface in an upright position.

Also it will be understood that although the terms "first" and "second" may be used herein to describe various components these components should not be limited by these terms. These terms are only used to distinguish one component from another. Thus, for example, a first component discussed above could be termed a second component and vice-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as the changes do not substantially affect their intended function. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle rear sprocket comprising:
a sprocket body having a center rotational axis, a first side surface and a second side surface, the first and second side surfaces facing oppositely with respect to an axial direction of the bicycle rear sprocket, the first side surface being a smaller sprocket facing side of the sprocket body; and
a chain engagement structure including a plurality of sprocket teeth extending radially outward from an outer periphery of the sprocket body,
the sprocket teeth including a first shift tooth and a second shift tooth, the second shift tooth being positioned at a third tooth position in a downstream direction of a rotational driving direction of the bicycle rear sprocket with respect to the first shift tooth, the first shift tooth and the second shift tooth functioning as a shift tooth that is configured to catch a link of a bicycle chain as the bicycle chain moves from a smaller bicycle rear sprocket to the bicycle rear sprocket,
the sprocket teeth further including either a first non-shift tooth having a first recess or a first toothless gap that is positioned in the downstream direction with respect to the first shift tooth and that is adjacent the first shift tooth,
the sprocket teeth further including either a second non-shift tooth having a second recess or a second toothless gap that is positioned in the downstream direction with respect to the second shift tooth and that is adjacent the second shift tooth.

2. The bicycle rear sprocket according to claim 1, wherein the first shift tooth has a first tip having a first leading corner on the first side surface of the sprocket body and a first trailing corner on the first side surface of the sprocket body, the first leading corner being positioned in the downstream direction with respect to the first trailing corner, the first leading corner being positioned closer to the first side surface of the sprocket body than the first trailing corner in the axial direction with respect to the center rotational axis.

3. The bicycle rear sprocket according to claim 2, wherein the second shift tooth has a second tip having a second leading corner on the first side surface of the sprocket body and a second trailing corner on the second side surface of the sprocket body, the second leading corner being positioned in the downstream direction with respect to the second trailing corner, the second leading corner being positioned closer to the first side surface of the sprocket body than the second trailing corner in the axial direction.

4. The bicycle rear sprocket according to claim 1, wherein a total number of the sprocket teeth is equal to or more than fifteen.

5. A bicycle rear sprocket assembly comprising:
a first rear sprocket including
a first sprocket body having a center rotational axis, and
a first chain engagement structure including a plurality of first sprocket teeth extending radially outward from an outer periphery of the first sprocket body,
the first sprocket teeth including a first shift tooth and a second shift tooth, the second shift tooth being positioned at a third tooth position in a downstream direction of a rotational driving direction of the bicycle rear sprocket with respect to the first shift tooth,
the sprocket teeth further including either a first non-shift tooth having a first recess or a first toothless gap that is positioned in the downstream direction with respect to the first shift tooth and that is adjacent the first shift tooth,
the sprocket teeth further including either a second non-shift tooth having a second recess or a second toothless gap that is positioned in the downstream direction with respect to the second shift tooth and that is adjacent the second shift tooth; and
a second rear sprocket
a second sprocket body having the center rotational axis, and
a second chain engagement structure including a plurality of second sprocket teeth extending radially outward from an outer periphery of the second sprocket body, the second sprocket being positioned adjacent to the first sprocket in an axial direction with respect to the center rotational axis;
a total number of the first sprocket teeth being larger than a total number of the second sprocket teeth by one, each of the first shift tooth and the second shift tooth selectively functioning as a shift tooth that is configured to catch a link of a bicycle chain as the bicycle chain moves from the second rear sprocket to the first rear sprocket.

6. The bicycle rear sprocket assembly according to claim 5, wherein
the first sprocket body has a first side surface and a second side surface, the first and second side surfaces facing oppositely with respect to an axial direction of the bicycle rear sprocket assembly, and the first side surface facing the second sprocket.

7. The bicycle rear sprocket assembly according to claim 5, wherein
the first shift tooth has a first tip having a first leading corner on the first side surface of the first sprocket body and a first trailing corner on the first side surface of the first sprocket body, the first leading corner being positioned in the downstream direction with respect to the first trailing corner, the first leading corner being positioned closer to the first side surface of the first sprocket body than the first trailing corner in the axial direction with respect to the center rotational axis.

8. The bicycle rear sprocket assembly according to claim 7, wherein
the second shift tooth has a second tip having a second leading corner on the first side surface of the first sprocket body and a second trailing corner on the second side surface of the first sprocket body, the second leading corner being positioned in the downstream direction with respect to the second trailing corner, the second leading corner being positioned closer to the first side surface of the first sprocket body than the second trailing corner in the axial direction.

9. The bicycle rear sprocket assembly according to claim 5, wherein
a total number of the first sprocket teeth is equal to or more than fifteen.

* * * * *